United States Patent [19]

Cheng et al.

[11] Patent Number: 5,018,852
[45] Date of Patent: May 28, 1991

[54] MOTION DETECTION, NOVELTY FILTERING, AND TARGET TRACKING USING AN INTERFEROMETRIC TECHNIQUE WITH GAAS PHASE CONJUGATE MIRROR

[75] Inventors: Li-Jen Cheng, LaCrescenta; Tsuen-Hsi Liu, Northridge, both of Calif.

[73] Assignee: The United States of America as represented by the Administrator of the National Aeronautics and Space Administration, Washington, D.C.

[21] Appl. No.: 568,129

[22] Filed: Aug. 16, 1990

[51] Int. Cl.$^5$ .......................... G01P 3/36; G01B 9/02; G01B 9/21

[52] U.S. Cl. .................................. 356/28.5; 356/345; 356/347; 250/201.9

[58] Field of Search ...................... 356/28.5, 345, 347; 250/201.9

[56] References Cited

U.S. PATENT DOCUMENTS 3,572,882  3/1971  Neumann.
4,215,936  8/1980  Winocur.
4,571,080  2/1986  Papuchon et al.
4,575,245  3/1986  Borde.
4,659,223  4/1987  Huignard et al.
4,767,195  8/1988  Pepper.
4,921,353  5/1990  Chiou et al. .................. 356/347

OTHER PUBLICATIONS

Fischer, Baruch et al., "New Optical Gyroscope Based on the Ring Passive Phase Conjugator", Appl. Phys. Lett. 47 (1), Jul. 1985.

Primary Examiner—Stephen C. Buczinski
Attorney, Agent, or Firm—Thomas H. Jones; Harold W. Adams; John R. Manning

[57] ABSTRACT

A method and apparatus for detecting and tracking moving objects in a noise environment cluttered with fast- and slow-moving objects and other time-varying background. A pair of phase conjugate light beams carrying the same spatial information commonly cancel each other out through an image subtraction process in a phase conjugate interferometer, wherein gratings are formed in a fast photorefractive phase conjugate mirror material. In the steady state, there is no output. When the optical path of one of the two phase conjugate beams is suddenly changed, the return beam loses its phase conjugate nature and the interferometer is out of balance, resulting in an observable output. The observable output lasts until the phase conjugate nature of the beam has recovered. The observable time of the output signal is roughly equal to the formation time of the grating. If the optical path changing time is slower than the formation time, the change of optical path becomes unobservable, because the index grating can follow the change. Thus, objects traveling at speeds which result in a path changing time which is slower than the formation time are not observable and do not clutter the output image view.

17 Claims, 4 Drawing Sheets

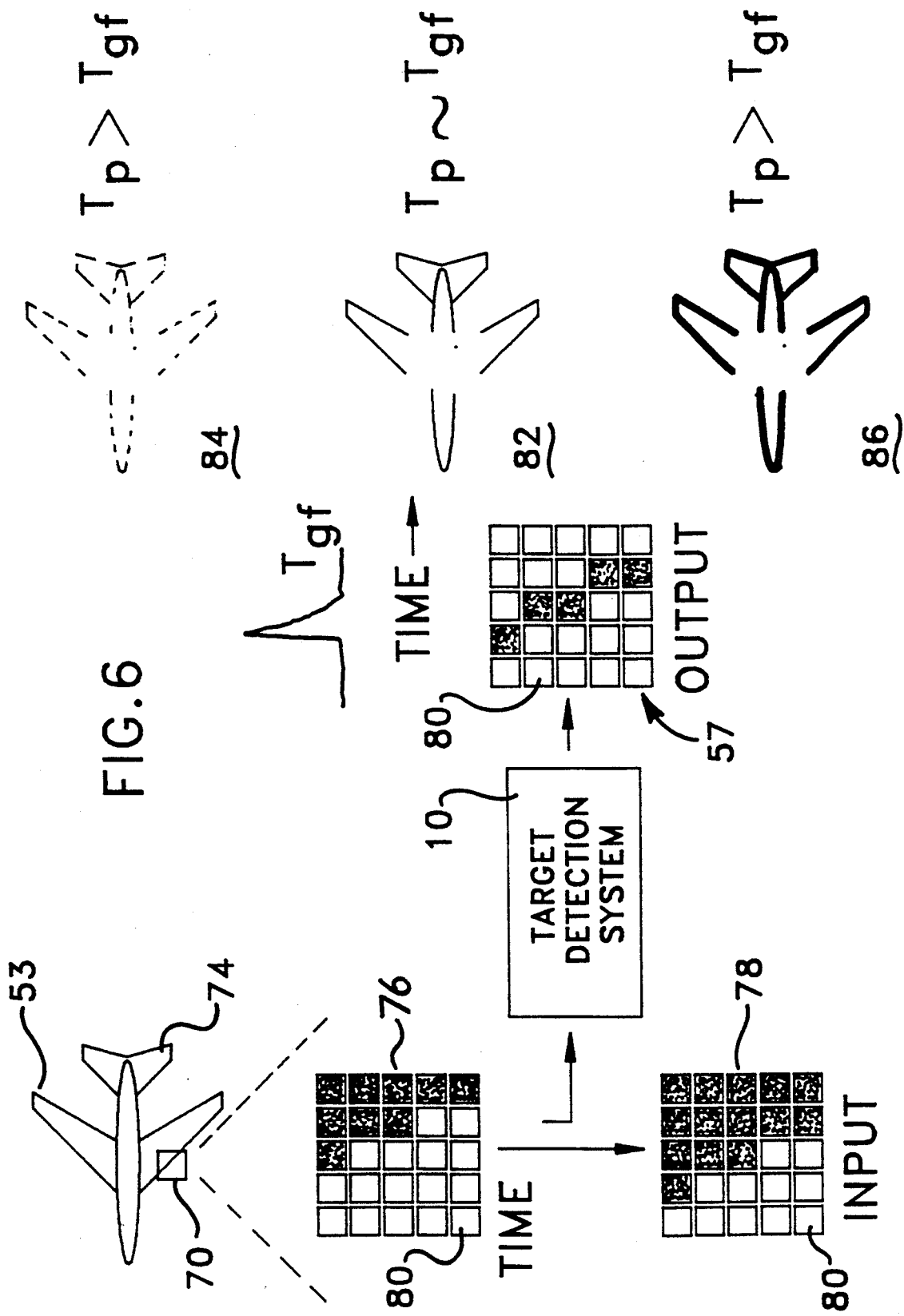

MOTION DETECTION, NOVELTY FILTERING, AND TARGET TRACKING USING AN INTERFEROMETRIC TECHNIQUE WITH GAAS PHASE CONJUGATE MIRROR

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The subject invention relates generally to motion detection and, more particularly, to an apparatus for detecting and tracking fast- and slow-moving objects in a noise environment, cluttered with other time-varying background.

BACKGROUND ART

Prior art tracking novelty filters have been employed at least since the early days of radar, when they were used to keep radar screens from becoming cluttered by nonmoving objects. A tracking novelty filter is readily implemented using a digital computer to subtract incoming images, pixel by pixel, from a stored reference image that is periodically updated. In 1987, Anderson, Lininger, and Feinberg proposed the concept of constructing a tracking novelty filter using a Michelson interferometer with a phase conjugate mirror. Such optical systems have the advantage of fast operation because of the parallelism of light.

Previous publications and demonstrations of such systems have involved the use of an interferometric configuration including a self-pumped phase conjugate mirror formed of barium titanate. This approach exhibits a slow response time and is therefore only suitable for detecting moving objects in a steady background. This approach is not sufficient for detecting fast (or accelerating) moving objects in a more realistic noise environment cluttered with other time-varying background.

STATEMENT OF THE INVENTION

It is therefore an object of the invention to improve motion detection systems;

It is another object of the invention to provide improved apparatus for detecting and tracking fast- and slow-moving objects in a noise environment cluttered with other time-varying background;

It is another object of the invention to provide an improved motion detection system employing an optical system;

It is another object of the invention to provide an improved motion detecting system employing an interferometer and phase conjugate mirror; and It is yet another object of the invention to improve the response time of optical motion detecting systems and, in particular, such a system employing an interferometer and phase conjugate mirror.

These and other objects and advantages are achieved according to the invention by using fast photorefractive crystals such as gallium arsenide (GaAs), indium phosphide (Inp), gallium phosphide (GaP), or cadmium telluride (CdTe) as the high speed dynamic holographic recording medium of a phase conjugate interferometer employed in a target detection and tracking system. An object scene is introduced to the phase conjugate interferometer by a spatial phase modulator which modulates the light in one of two optical paths of the interferometer. The spatial light phase modulator may be controlled to modulate the light in accordance with the output of a sample hold circuit.

The minimum detectable speed (MDS) of the system is approximately the spatial resolution of the system divided by the grating formation time of the fast photorefractive crystal. Any objects moving at speeds slower than the MDS are not detected. The MDS value of a system can be adjusted by changing the grating periodicity or light intensity in the system. The MDS can be further controlled by the sample-and-hold circuit, as discussed hereafter.

The invention thus provides a thresholding technique for detecting and tracking only the objects moving at speeds over a certain value. Therefore, the system can detect and track fast- and slow-moving objects in a noise environment cluttered with other time-varying background.

BRIEF DESCRIPTION OF THE DRAWINGS

The just-summarized invention will now be described in detail in conjunction with the drawings, of which:

FIG. 6 is a schematic diagram illustrative of expected observations in a system according to the invention.

DETAILED DESCRIPTION OF THE INVENTION

In an optical approach employed according to the preferred embodiment, a pair of phase conjugate beams carrying the same spatial information (intensity and phase) commonly cancel each other out, through an image subtraction process in a phase conjugate interferometer. Therefore, in the steady state, there is no output. When the optical path of one of the two phase conjugate beams is suddenly changed, the return beam loses its phase conjugate nature and the interferometer is out of balance. Consequently, an observable output results. The observable output lasts until the index grating of the phase conjugate mirror of the interferometer is altered to adapt to the change; that is, until the phase conjugate nature of the beam has recovered. The observable time of the output signal is roughly equal to the formation time of the grating. This phenomenon provides a means for detecting motion. If the optical path changing time is slower than the formation time, the change is unobservable, because the index grating can follow the change, thus the phase conjugate relationship is always preserved. The minimum detectable rate of change of the optical path is approximately equal to the formation time of the grating. This rate can be varied in accordance with system parameters.

Figure 1:
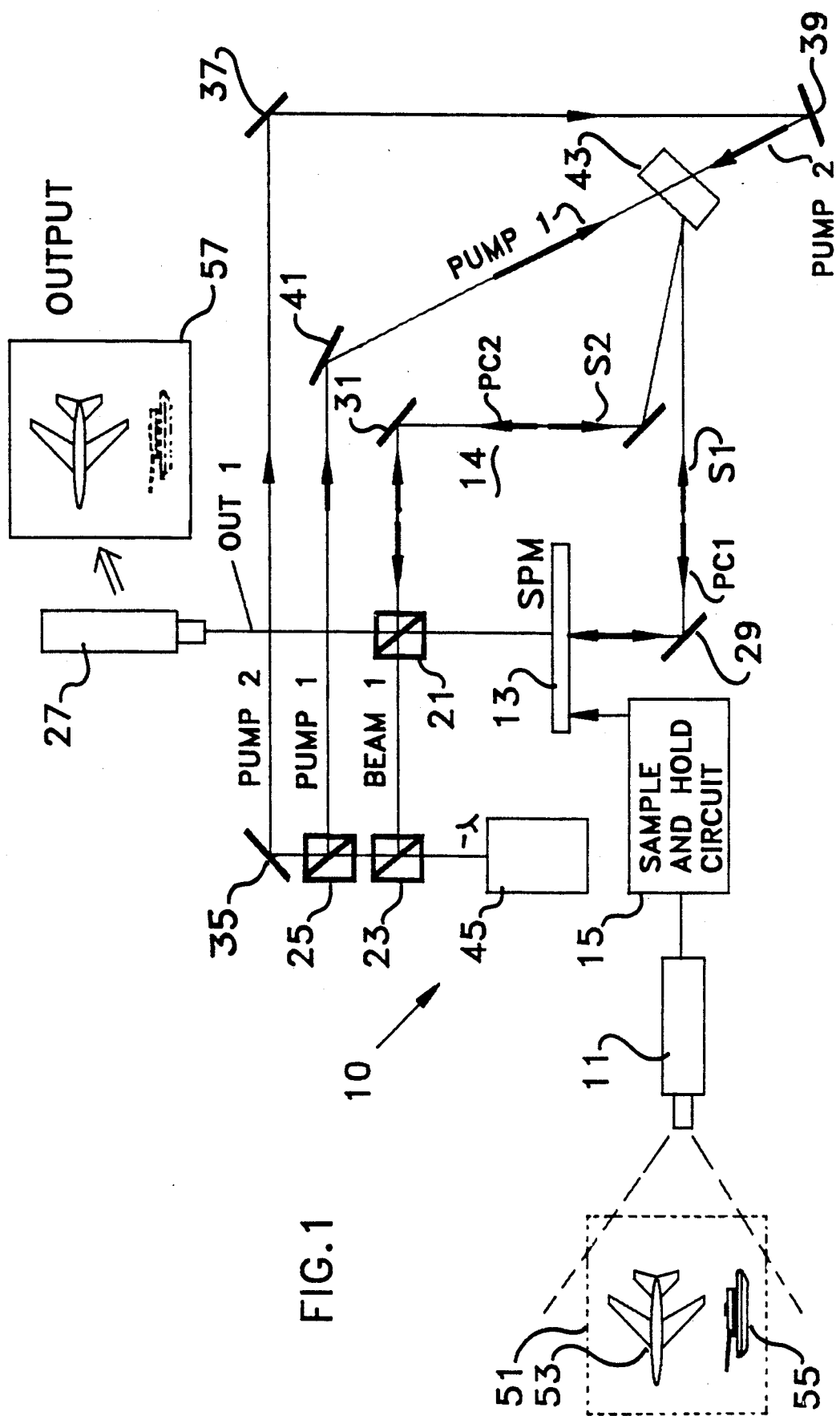
FIG. 1 is a schematic diagram of the preferred embodiment.

A target detection and tracking system 10 according to the preferred embodiment and employing the foregoing approach is illustrated in FIG. 1 of the drawings.

The system 10 of FIG. 1 includes a first high-speed movie camera 11, which may comprise a charge-coupled device (CCD) camera of various types for visible object scenes or an infrared camera for infrared object scenes. The output of the camera 11 is coupled to a spatial light phase modulator (SPM) 13, to be discussed hereinafter, through a sample-and-hold circuit 15. The SPM 13 is placed in one of two optical paths of a phase conjugate interferometer 14. The interferometer 14 includes a phase conjugate mirror comprising a fast photorefractive semiconductor crystal 43, such as gallium arsenide (GaAs). Instead of the GaAs crystal, one could use other photorefractive semiconductor crystals, such as InP, GaP, CdTe, or any suitable fast photorefractive material.

The phase conjugate interferometer 14 includes first, second, and third beam splitters 21, 23, 25; a high speed movie camera 27; first, second, third, fourth, fifth, sixth, and seventh mirrors 29, 31, 33, 35, 37, 39, 41; the fast photorefractive semiconductor crystal 43, and a laser source 45 that provides a coherent light beam of wavelength compatible with the operation of the photorefractive crystal 43.

The high speed frame camera 27 may be an infrared vidicon camera, an infrared semiconductor detector array camera, a charge coupled device (CCD) camera, or a charge transport device (CTD) camera, for example, as long as its operational wavelength is compatible with the laser wavelength. The laser source 45 provides a coherent light beam $\lambda$ that may be a 1.06-micron Nd:YAG laser, a tunable Ti-sapphire laser, or a semiconductor injection laser, for example.

The light beam $\lambda$, emitted from the laser source 45, is split into three beams BEAM1, PUMP1, and PUMP2 by two beam splitters 23, 25. BEAM1 is then split into two source beams S1, S2 by a beam splitter 21. The source beam S1 passes from the beam splitter 21 through the SPM 13, during which the phase front of the source beam S1 is spatially modulated in accordance with the image signal from the camera 11. The source beam S1 and source beam S2 are both incident upon a polished surface of the GaAs crystal 43, after reflection at mirrors 29 and 33, respectively.

Figures 3, 4:
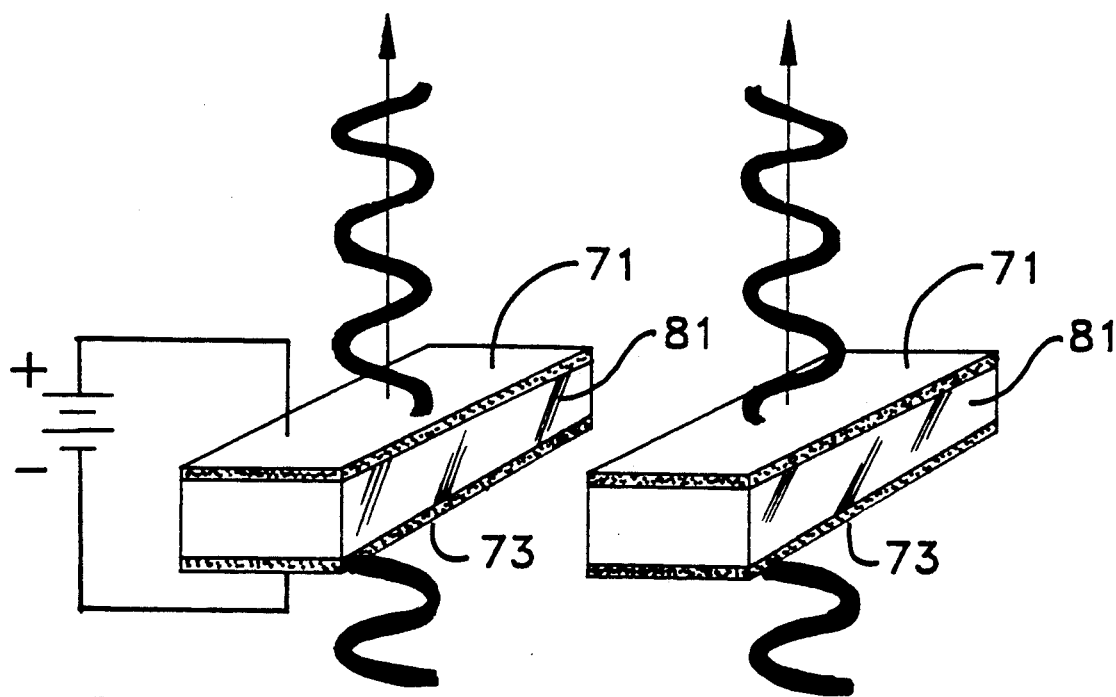
FIGS. 3 and 4 are perspective schematic views of an individual SPM element, respectively, with and without an applied electric field.

Each source beam S1, S2 creates a respective index grating with a coherent beam, PUMP1, from the laser source 45. The gratings are generally overlapping and have a slightly different orientation with respect to one another. Another beam, PUMP2, also from the laser source 45, but not necessarily coherent with respect to the other beam PUMP1, travels in the opposite direction from PUMP1 and enters the crystal 43 at an opposite polished surface. Parts of this beam PUMP2 are diffracted by the gratings of the crystal 34, forming two phase conjugate beams, PC1 and PC2. As shown in FIG. 4, the two phase conjugate beams PC1, PC2 travel along the same optical paths as beams S1 and S2, but in a direction opposite thereto. These two beams PC1, PC2 combine at the beam splitter 21 and form an output beam OUT1, which is imaged on the camera 27.

Because of the reflection of the beam PC2 at the beam splitter 21, the reflected beam of PC2 has a one hundred eighty (180) degree phase retardation with respect to the transmitted beam of PC1. After passing through the beam splitter 21, the two beams PC1, PC2 create a destructive interference image at the camera 27. By properly adjusting the relative intensities of the two source beams S1 and S2, a complete destructive interference can occur due to the nature of phase conjugation, namely, there is no output light. There are several well-known techniques for adjusting the relative intensities. A simple one is to insert a variable neutral density filter (not shown) in the path of the beam S2.

In operation of the overall system of FIG. 1, an incoming object scene 51 with moving objects is picked up by the TV camera 11, and the time variation of the scene is sequentially sent to the SPM 13 placed in the optical path S1 of the phase conjugate interferometer 14. If there is no moving object in the scene 51, the interferometer 14 is in balance and there is no output signal detected by the camera 27 in the interferometer 14. If there are several moving objects, images of those with speeds larger than the MDS of the system appear in an output 57. Objects with speeds less than the MDS value are not detectable. As illustrated in FIG. 1, the incoming object scene 51 contains a fast-moving plane 53 and a slow-moving tank 55. The plane 53 is observed and tracked by the system, but the slow-moving tank 55 is not clearly seen in an output 57.

Figure 2:
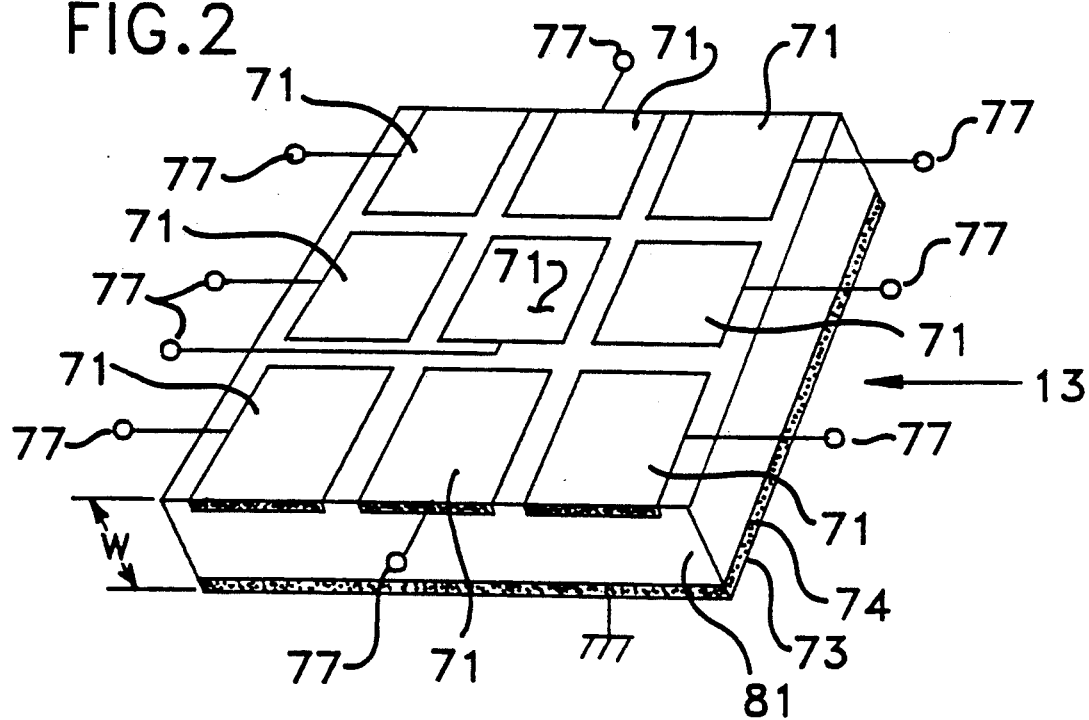
FIG. 2 is a perspective schematic view of a portion of a spatial light phase modulator (SPM) according to the preferred embodiment.

The spatial phase modulator 13 is a device which can change the refraction index of its active material in response to an external signal, such as an applied electric field, equivalent to a change in optical path length through the device. As shown in FIG. 2, the SPM 13 may comprise a matrix of individually addressed transparent electrodes 71 on the top surface thereof, and a planar ground electrode 73 on the bottom surface 74. Each individual transparent electrode 71 can have a separate voltage level applied thereto via a respective contact 77. The contacts 77 are shown schematically for purposes of clarity. Sandwiched between the electrodes 71, 73 is a layer 81 of electro-optical material having a predetermined electrical orientation. This layer 81 of electro-optical material is made of common electro-optic materials, such as liquid crystals, lead lantalum zirconate titanate (PLZT), lead zirconate titanate (PZT), or others. The SPM 13 has a width "w" which is equal to the length of one wavelength of the coherent beam $\lambda$.

The SPM 13 of FIG. 2 is used in conjunction with an electronic sample hold circuit 15 which is of a frame storage type, e.g., a frame memory, for storing an electrical signal for each element or pixel of an array corresponding to the image of the object scene 51, as known in the art. A voltage corresponding to the stored electrical signal of each pixel is applied to a respective corresponding electrode 77 of the SPM 13. For example, if the pixel values represent a logical "1," a voltage will be applied to an electrode 71 as shown in FIG. 3; whereas, if a signal corresponding to a logical zero is stored at a corresponding pixel in the frame storage, no voltage will be applied to the corresponding electrode, as shown in FIG. 4.

The SPM 13 operates as follows. The light beam passing through the portion of the SP 13 having the applied electrical field will interact with the electrical field, causing an electro-optical effect. This electro-optical effect increases the refraction index of the light beam passing therethrough, thus decreasing the velocity of the light beam, in comparison to the light beam passing through the portion of the SPM 13 without the electrical field. Thus, the light beam that has passed through the electrical field is now behind the other light beam, is 180 degrees out of phase therewith, and has thus been phase modulated. A light beam which is modulated by the SPM 13 is modulated in a spatial direction, transverse to the direction of propagation of the beam.

The amplitude of modulation is proportional to the applied voltage.

In order to demonstrate experimentally the motion detection capability of the fast photorefractive semiconductor 43, a moving mirror, such as a mirror mounted on a piezoelectric transducer, may be used as a one-pixel spatial phase modulator. According to current camera technology, signals from the camera 11 are electrical and in sequence. Therefore, it is desirable that the spatial phase modulator used in the subject motion detection and tracking system be electrically addressable and pixelized if it is to employ conventional camera technology.

Figure 5A:
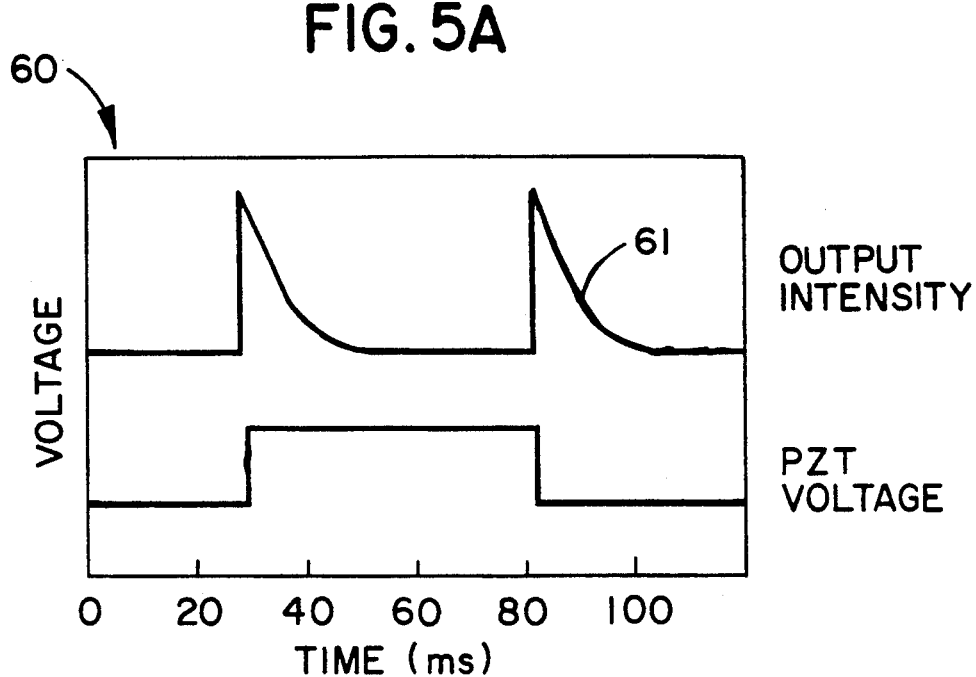
FIG. 5 is a graph illustrative of operating principles of the invention.
Figure 5B:
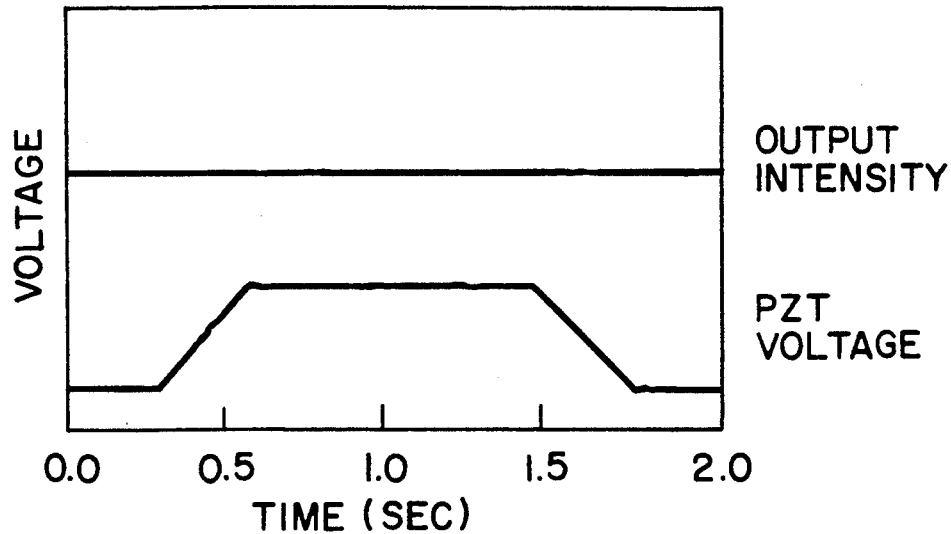

Typical results of an experiment using a GaAs phase conjugate interferometer 14 with a moving mirror as just described are shown in a pair of graphs 60, 62 of FIG. 5, where time is along the abscissa and voltage is along the ordinate. A slow motion graph 62 shows that there is no output signal when the mirror is steady or moving slowly. A fast motion graph 60 shows a transient spike-shape output signal 61 appears when the mirror moves fast. The signal lasts considerably longer than the motion, because the time required for building a new index grating to adapt the change is longer. As discussed hereinafter, the slow-moving object can also be detected if a proper sample-and-hold circuit 15 is implemented in the system. The grating formation time is reciprocally proportional to the square of the grating periodicity and to beam intensity. This provides a wide range of minimum detectable rates. For example, the response time in GaAs can vary from a fraction of a second to tens of microseconds.

FIG. 6 illustrates expected observations of motion detection and tracking using the preferred system 10. Attention is paid to observation of the motion of a small portion 70 of an airplane wing 74. Two sequential pictures 76, 78 of the portion 70 of the wing edge 74 are shown at a leftmost portion of FIG. 6. The airplane 53 is assumed to be moving from right to left in the figure. The system output 57 is the difference between the two pictures 76, 78 and lasts approximately the time similar to the grating formation time, $T_{gf}$. If the time required for the wing edge 74 to move from one pixel 80 to another pixel 80, $T_p$, is approximately equal to $T_{gf}$, a sharp picture of the airplane may be observed as illustrated in the middle picture 82 in rightmost portion of FIG. 3. If $T_p$ is longer than $T_{gf}$, a faint signal can be expected, as seen in a top most picture 84. If $T_p$ is larger than $T_{gf}$, an elongated picture 86, that is, elongated along the motion direction, may be observed. These expected phenomena can be used to determine the speed of the moving object.

In addition, implementation of an appropriate sample-and-hold circuit 15 between the scene input camera 11 and the SPM 13 can enable the system to detect and track slow-moving objects. The sample-and-hold circuit 15 retains an input signal received from the camera 11. The retained signal is held for a predetermined amount of time, before the next input signal is received by the sample-and-hold circuit 15. Thus, the frames output by the camera 11 may be delayed so that the difference in motion of objects imaged by the camera 11 is larger. This process enables a lower MDS.

The GaAs system just disclosed has a relatively high degree of immunity to low frequency mechanical vibration and air turbulence. This is due to the fact that the response of GaAs is fast and the formation of the grating can follow the disturbance. This is an important advantage in practical application.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Apparatus for detecting an object moving in excess of a selected speed comprising:
    means for generating an image signal from an object scene;
    an interferometer means comprising:
        a photorefractive crystal means;
        a means for generating first and second pump beams and first and second source beams for forming first and second gratings in said photorefractive crystal means;
        said interferometer means further generating first and second phase conjugate beams by diffraction of said second pump beam by said first and second gratings, the first phase conjugate beam being 180 degrees out of phase with the second;
        said interferometer means further operating to combine said first and second phase conjugate beams for forming an output beam comprising an interference pattern which is destructive in the absence of an object moving in excess of said selected speed and nondestructive when an object moving above said selected speed is present in said object scene;
    spatial light phase modulator means for spatially modulating the phase front of said first source beam in accordance with said image signal; and
    means interacting with said output beam for providing an output image signal when an object moving above said selected speed is present in said object scene.

2. The apparatus according to claim 1 further including a sample-and-hold circuit means coupled between said image signal generating means and said spatial light phase modulator means for sampling said input signal and for holding the sampled input signal for a predetermined amount of time.

3. The apparatus of claim 2 wherein the sample-and-hold circuit means comprises means for storing a matrix of electrical signals corresponding to a selected frame of said image signal.

4. The apparatus according to claim 1 wherein said generating means comprises a high speed movie camera means.

5. The apparatus according to claim 1 wherein said spatial light phase modulator comprises:
    a transparent ground electrode layer;
    a layer of transparent electro-optical material disposed on top of said ground electrode; and
    a matrix of transparent electrodes disposed on top of said layer.

6. The apparatus according to claim 1 wherein said means for generating said first and second source beams includes:
    a laser; and
    beam splitter means for generating said first and second source beams.

7. The apparatus for detecting and tracking fast- and slow-moving objects according to claim 6 wherein said laser source exhibits a wavelength of substantially 1.06 microns.

8. The apparatus of claim 1 wherein said fast photorefractive crystal means comprises a gallium arsenide crystal.

9. The apparatus of claim 1 wherein said fast photorefractive crystal means comprises an indium phosphide crystal.

10. The apparatus of claim 1 wherein said fast photorefractive crystal means comprises cadmium telluride crystal.

11. The apparatus of claim 1 wherein said first photorefractive crystal means comprises a gallium phosphide crystal.

12. An apparatus for detecting and tracking objects in a noise environment cluttered with other time-varying background, comprising:
   an input means for providing an input signal;
   a light modulation means coupled to said input means;
   a light beam means for emitting a light beam;
   a beam splitting means optically coupled to said light beam means for forming first and second source light beams, a first pump light beam and a second pump light beam, said first source light beam transmitted through said light modulation means for modulation thereof;
   reflection means for directing said first and second source beams along first and second separate predetermined converging optical paths and for directing said second pump beam along a third path;
   photorefractive means disposed in said converging optical paths and having an incident surface for forming first and second gratings therein in response to the incidence of said first and second source light beams and said first pump beam, said photorefractive means having a second surface on a side disposed in said third path, said photorefractive means thereby receiving said second pump beam through said second surface;
   said second pump beam interacting with said gratings to form first and second phase conjugate light beams transmitted along the respective optical paths of said first and second source light beams in a direction opposite thereto;
   said beam splitting means forming an output beam in response to said first and second phase conjugate light beams; and
   an output means for displaying an image present in said output beam;
   whereby when the optical path of one of said phase conjugate light beams is changed at a selected rate, the other of said phase conjugate light beams loses its phase conjugate properties, thus resulting in display of an image by said output means.

13. The apparatus according to claim 12 further including a sample-and-hold circuit means coupled between said input means and said light phase modulation means for sampling said input signal and for holding the sampled input signal for a predetermined amount of time.

14. The apparatus of claim 13 wherein the sample-and-hold circuit means comprises means for storing a matrix of electrical signals corresponding to a selected frame of an image signal.

15. The apparatus according to claim 12 wherein said input means comprises a high speed movie camera means.

16. The apparatus according to claim 12 wherein said light modulation means comprises:
   a transparent ground electrode layer;
   a layer of transparent electro-optical material disposed on top of said ground electrode; and
   a matrix of transparent electrodes disposed on top of said layer.

17. A method of image detection utilizing a phase conjugate interferometer having an output comprising the combination of first and second phase conjugate beams, said method comprising the steps of:
   spatially modulating a light beam in one arm of said phase conjugate interferometer in accordance with the image in an object scene;
   generating said first and second phase conjugate beams in said interferometer by passing a coherent pump beam through gratings formed in a fast photorefractive crystal; and
   supplying said output to a means for converting said output into a visual display, whereby said visual display displays an object in said object scene which is moving at a speed above a speed selected at least in part by the grating formation time of said crystal.

* * * * *